INVENTORS
ROBERT P. McMANUS
RALPH H. MILLER, JR.
HERMAN J. WIRTH
LESTER J. KINKEL
THEODORE C. DICKARD, JR.

ATTORNEYS

United States Patent Office 3,495,215
Patented Feb. 10, 1970

3,495,215
DECODING SYSTEM
Robert P. McManus, San Diego, Ralph H. Miller, Jr., La Mesa, and Herman J. Wirth, Lester J. Kinkel, and Theodore C. Dickard, Jr., San Diego, Calif., assignors to the United States of America as represented by the Secretary of the Navy
Filed Dec. 30, 1965, Ser. No. 517,866
Int. Cl. G08b 29/00
U.S. Cl. 340—146.1                                7 Claims

ABSTRACT OF THE DISCLOSURE

The decoder system of the present invention preferably comprises a threshold detector, a comparator, an error correction circuit, a code selection programmer, and a channel and code display indicator. The instant decoding system is capable of indicating the intelligence represented by an encoded signal and the frequency of the signal in the presence of severe attenuation.

---

Figure 1:
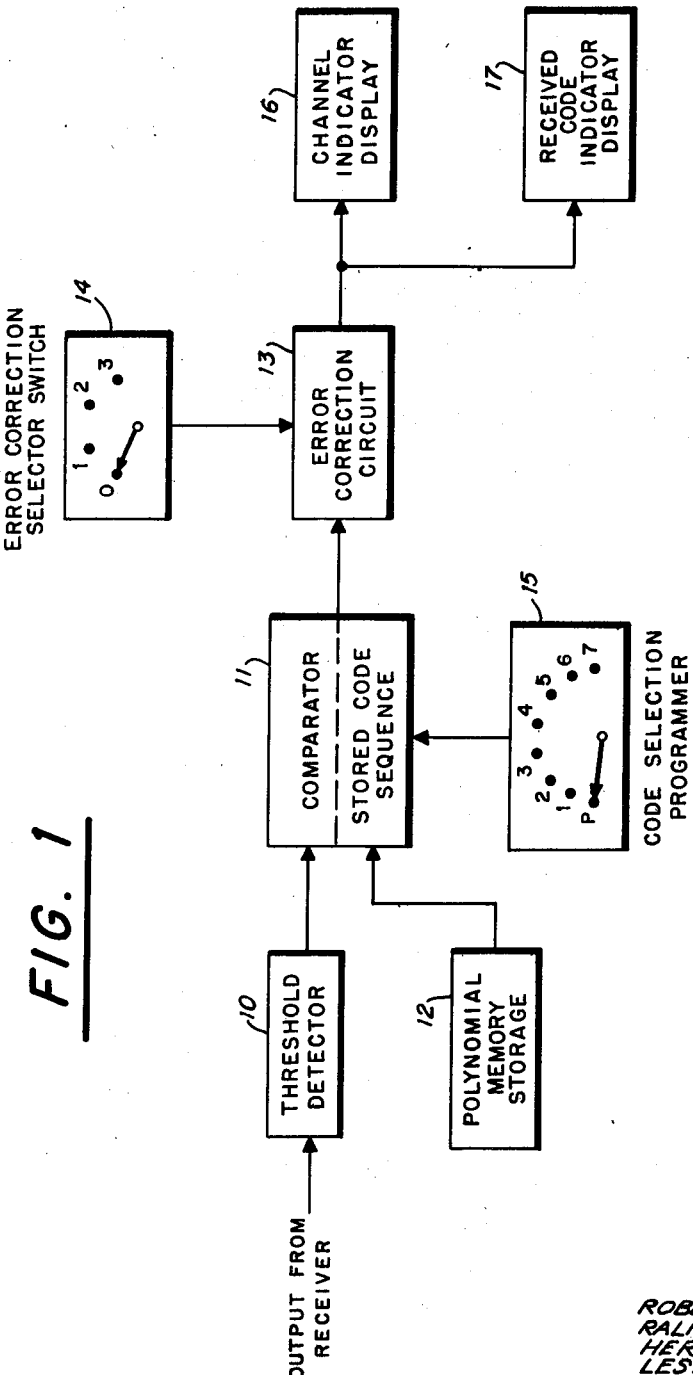

The present invention is concerned with a decoding system and more particularly with a system which is especially adapted to detect and verify pulse time encoded signals.

The decoding system conceived by the present invention is specially advantageous for use with an improved sounding system of the type disclosed in copending application Ser. No. 517,870, filed Dec. 30, 1965. Such an improved sounder system encodes signals for transmission over a particular point-to-point path employing oblique incidence ionospheric techniques so as to test a particular path for stability and reliability of supporting intelligence communications between two remote points. Prior art sounder systems had employed the technique of transmitting groups of pulses containing no intelligence information in code or other form and the effectiveness of the reception of such transmitted pulses was usually displayed to indicate the stability and reliability of the particular point-to-point path so tested and the frequency at which such pulse signals were transmitted.

Typically, a display in a prior art conventional sounder system may comprise what is known as an ionogram. An ionogram consisted of a visual display of those frequencies which would support transmission over a particular path between a transmitter and a receiver located at remote sites. This visual indication is usually displayed on a storage oscilloscope and illuminations on the face of the oscilloscope are representative of the received pulses on each frequency tested by the sounding system. As will be understood by those skilled in the art, such visual display on a storage type of oscilloscope is the result of an optical integration whereby the integration illuminates a spot on the face of the oscilloscope to denote reception of pulses on that frequency by the receiver. However, with a disturbed ionosphere it is possible that one or more of the transmitted pulses will not arrive at the receiver at the remote point and when this occurs it is possible for the observer of the storage oscilloscope to falsely assume that the path being tested for stability and reliability is useable since the intensity difference on the oscilloscope face may not be readily visually discernible because only a portion of the pulses so transmitted may be significantly attenuated or otherwise suffer interference. Thus, in the prior art technique the integrated signal may obscure the partial absence of pulses lost or severely attenuated in transmission.

The improved sounder system alluded to previously, transmits sounder signals which are encoded to communicate intelligence and such encoding may preferably be of the pulse time coding type so that the transmitted sounding signal is not merely repetitive equally spaced pulse signals as was true of the prior art sounder transmission signals. Accordingly, the decoding system which is employed with such an improved sounder system must uniquely include a two-fold function. This is true because an encoded sounder system signal not only denotes which frequency or frequencies have encountered strong interference in the course of transmission, but also by recognition of the encoded intelligence which is transmitted in discrete code elements, denotes the sustained time for which path stability must exist to permit each sequential discrete code element to be received and decoded in order to establish the intelligence contained in such code sequence. Essentially, the decoder system of the present invention may preferably be comprised of five essential logical elements in the form of a threshold detector, a comparator, an error correction circuit, a code selection programmer and channel and code display indicator. The threshold detector is responsive to a determinable amplitude of received signal for producing an output indicative of the presence of a pulse. A comparator circuit is arranged to receive the successive outputs of the threshold detector and performs the function of comparing predetermined pulse time sequences of such received and detected signals with a plurality of like sequences of code information. In accordance with the concept of the present invention, the comparator is responsive to a confirmatory comparison for producing a signal which is representative of the presence of the code sequences so identified. Appropriate indicator means, preferably of the visual oscilloscope type, is arranged to receive the signal representative of the presence of a particular code sequence which has been received and identified, and such indicator means indicates the reception of the identified code sequence as well as the frequency at which such identified code sequence was transmitted and received. In a preferred embodiment of the present invention there will also be included an error correction means which is arranged by appropriate logic circuitry to be responsive to substantial confirmatory comparison of a particular code sequence for identifying and indicating the presence of the code sequence so recognized in the absence of one or more discrete code elements of the code sequence.

Accordingly, a primary object of the present invention is to provide an improved decoding system capable of indicating the intelligence represented by an encoded signal as well as the frequency at which such signal was received.

An equally important object of the present invention is to provide such a decoding system which is capable of identifying encoded sequences wherein one or more discrete code elements may be severely attenuated or otherwise interfered with or obscured.

A further object of the present invention is to provide such a decoding system in which there is included means for storing code information in the form of a plurality of code sequences for comparison with receved code sequences.

Yet another object of the present invention is to provide such a decoding system in which the stored code sequence information may be circulated for comparison purposes or selected individually or in groups for comparison with received code sequences.

Another object of the present invention is to provide such a decoding system including the capability of generating and/or storing code sequence information as desired for purposes of comparison with received code sequences for the identification of such received signals.

These and other objects, advantages and features of the present invention will appear more clearly from the description of an embodiment which follows when taken together with the illustrative drawings and the scope of the invention will be pointed out in the appended claims.

Figure 2:
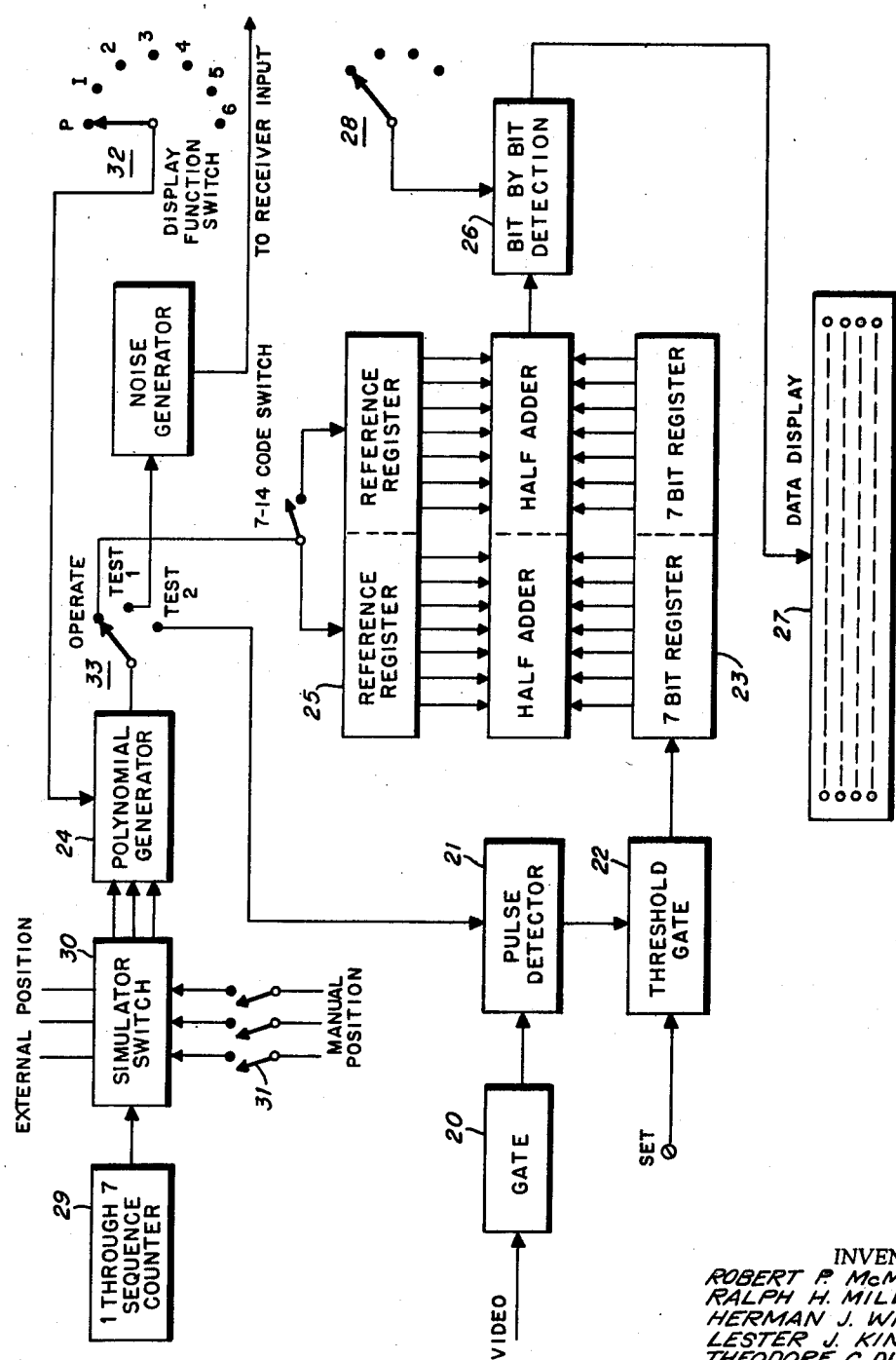

In the drawings:

FIG. 1 is a schematic block diagram of the decoder system of the present invention; and FIG. 2 is a schematic diagram showing somewhat more detail of the decoder system illustrated in FIG. 1.

In accordance with the concept of the present invention a preferred embodiment may include the five elements comprising a threshold detector, a comparator, an error correction circuit, a code selection programmer, and appropriate indicators for channel and code display. Such an arrangement is schematically illustrated in FIG. 1. A pulse time encoded signal which is transmitted by the sending portion of a typical oblique incidence sounder system is received at a remote point by an appropriate receiver whence it provides the input to a threshold detector 10 as illustrated in FIG. 1. The threshold detector 10 is designed to be responsive to a determinable amplitude of signal within a pulse time increment for indicating the presence or absence of signal and its output is either a commensurate signal or the absence of such signal. The output of the threshold detector 10 provides the input to a comparator 11. The comparator 11 has the function of comparing a sequence of signals within a predetermined number of pulse time elements with code sequences of like number of pulse time elements. Such code sequences may be stored in an appropriate storage code sequence means as indicated to be a portion of the comparator circuit 11 or may be generated from a polynomial memory storage 12 or generated from a polynomial generator means as will be explained more fully hereinafter.

An error correction circuit 13 performs the function of identifying a received code sequence as being a particular code sequence when such received signals of a code sequence are incomplete or have one or more discrete elements of the code sequence badly attenuated or obscured by interference effects. An error correction selector switch 14 affords a means of selectively providing the recovery of a received code sequence for the intelligence information contained therein by identification with the correct code sequence when such received code sequence is incomplete by reason of one, two or three undetected code elements.

A code selection programmer 15 affords a means of selecting a particular code to be identified, the rejection of such a received code sequence, or the acceptance of all received code sequences as may be desired. The output of the error correction circuit 13 provides the input for both a channel indicator display 16 and a received code indicator display 17. The channel indicator display is employed to visually indicate the frequency at which an identified code sequence was received therefore identifying a frequency which will sustain satisfactory communications between the transmitter point and the receiver point of the sounder system. The received code indicator display 17 is employed to indicate the intelligence communicated by an identified code sequence received at the receiving station. Such intelligence may indicate, for instance, the preference of the transmitter station as to frequencies to be employed for communication purposes from the point of view of favorable or unfavorable signal-to-noise ratios existing at the transmitter station, for example.

Thus, the decoding system illustrated by the schematic diagram of FIG. 1 performs the function of detecting the presence or absence of pulse signals within a predetermined pulse time increment, the comparison of such detected code sequences with known or selectively determinable code sequences containing intelligence information, the correction of such errors as may be caused by the absence of one or more code increments within code sequences and the indication of the frequency at which such identified code sequences are received, as well as the coded information contained in such identified code sequences.

The illustration of FIG. 2 shows portions of the system illustrated in FIG. 1 in somewhat more detail as to the preferred manner of operation of the present invention. In the system illustrated in the schematic diagram of FIG. 2, the received signal enters a quantizing arrangement which is comprised of a gate 20, a pulse detector 21 and a threshold gate 22 where it is converted to one of two logic levels i.e. a "0" or a "1." A logical "1" results if the received signal has a larger amplitude than the mean value of the channel noise or accumulated interference. The quantized data output of threshold gate 22 is shifted into a buffer storage 23 where it is accumulated bit-by-bit in the register portion of the buffer storage 23. It will be apparent to those skilled in the art that in the system illustrated in FIG. 2 a seven bit binary code is being employed and therefore a seven bit register performs the accumulating and storage function described previously.

In the illustrated system, a typical operation would be for the transmitted signal to be stepped to a different frequency after having transmitted a complete code sequence of seven binary bits. Accordingly when seven binary bits of information are accumulated in the seven bit register portion of the buffer storage 23, it is caused to be cycled through the decoding circuits for correlation with one of the predetermined and known codes which are generated within the decoder system in a manner that will be explained more fully hereafter. If no correlation is realized between the received code sequence and the stored or known predetermined sequences, the decoding operation will provide no meaningful output and therefore no information will display on the data display means 27. If, however, a correlation is realized between the code sequence received and detected and one of the stored or internally generated code sequences of the decoder system, an indicator corresponding to the frequency channel at which the recognized code sequence was transmitted will display on the data display means 27 to indicate the transmitted and received frequency. At the same time an indicator will display on the data display 27 the intelligence information contained in the code sequence which has been transmitted, received and identified by verification against a known predetermined code sequence. Accordingly, the data display 27 may indicate, for instance, that a particular frequency has been received and the transmitted code has been identified signifying that there is a favorable signal-to-noise ratio for communication purposes existing at the transmitter point.

Thus in the course of operation of the illustrated system, information in the form of pulse encoded signals obtained from the threshold gate 22 during a given pulse repetition frequency period, is shifted into the first position of the fourteen bit register 23 when the leading edge of the next pulse repetition frequency pulse occurs. The data thus shifted into the register is stored until a signal from an associated portion of the receiver indicates that all of the data on a particular frequency channel for a complete code sequence has been received. The shift register 23 is then employed for use as a recirculating memory for the decoding cycle which follows.

Within the decoding system, illustrated in FIG. 2, there is contained a polynomial generator 24 which serially generates and shifts out each of seven codes, for instance. In a typical operation, such seven codes have a predetermined and ordered sequence and are representative of predetermined intelligence information. The polynomial generator 24 and a reference register 25, together with the shift register 23, are shifted in synchronism so that their respective code sequence outputs may be compared bit-by-bit in an appropriate detector 26. Such a bit-by-bit comparison continues through the plurality of code sequences in order, until the received code sequence is confirmed by bit-to-bit correlation with a code sequence of a like number of discrete code elements developed by the polynomial generator 24.

An error correction selector switch 28 is arranged so that the detector 26 may be selectively controlled to be responsive for identifying code sequences with one, two or three of the discrete code elements lacking confirmation by reason of bit-by-bit comparison or with confirmation of all discrete code elements by reason of bit-to-bit comparison with the known and locally generated code sequences. This is accomplished by the comparison errors being counted so that if the number of bit-by-bit comparison errors during one circulation of the data through the memory, is more than the amount selectively set by the error correction selection switch 28, the cycle will automatically repeat the next code sequence from the polynomial generator and produce an output indicative of lack of confirmation of received code sequence. If, however, the number of errors as developed by bit-by-bit comparison of the received code sequence with one of the code sequences developed by the polynomial generator 24 is equal to or less than the number selectively set by the error correction switch 28 the decoding cycle stops and a signal is generated by the detector 26 which is sent to the data display 27 for indicating the reception of a confirmed and identified code sequence at a particular frequency. If a received code sequence, after such detection and bit-by-bit comparison, is not confirmed as being one of the known intelligence containing code sequences developed by the polynomial generator 24, the decoding cycle will terminate and no signals are sent to the data display 27 since at this point of operation all the possibilities of comparison for a confirmatory identification of the received code sequence have been exhausted. Thus, the system, at that point, operates to perform a like series of operations with the next received code sequence which in a typical operation will be at another frequency.

The system illustrated in FIG. 2 also includes a sequence counter 29, a simulator switch 30, and a manually positionable switch array 31. The frequency counter 29 provides a one-through-seven sequence count when the system is operating with a seven bit binary code; its output is connected to the simulator switch 30 which may be arranged to receive an external signal or to receive the signal from an array of manually positionable toggle switches 31 so that they represent a "1" or "0" position of an octal code, for instance. These three bits may be fed into the polynomial generator 24 which, in turn, may be arranged to operate in the manner of the polynomial generator disclosed and described in copending application, Ser. No. 517,867, filed Dec. 30, 1965, so as to generate a series of related code sequences having seven discrete binary bits to each sequence. A test switch 33 is arranged to receive the output of the polynomial generator for connection to the fourteen bit reference register 25 or to alternative test positions as illustrated, which test functions form no part of the present invention. The polynomial generator 24 is connected to a display function switch 32 by means of which all of the seven code sequences or only specific selected sequences may be caused to be generated by the polynomial generator. Thus, the remainder of the system is controlled to provide a comparison between all of the code sequences generated by the polynomial generator 24 or only certain selected sequences under the control of the display function switch 32.

From the foregoing description it may be readily seen by those skilled in the art that the present invention provides a decoding system for detecting and verifying pulse time encoded signals through bit-by-bit comparison of received code sequences or visually or otherwise indicating or recording the favorable transmission and reception of certain frequencies over a known communication path. At the same time intelligence information contained within such favorably received code sequences is identified and displayed by visual indicators or other appropriate means.

Moreover, the present system provides a means by which confirmatory identification of code sequences may be made though one or more of the discrete code elements are obscured, attenuated or otherwise interfered with in the course of transmission from the remote transmitting station to the receiving station where the decoding system is located.

Additionally, the concept of the present invention is such that the decoding system may include an automatic polynominal code generator substantially of the type employed to initially generate code sequences of intelligence-containing signals at the transmitting station for purposes of bit-by-bit comparison of the plurality of generated code sequences with the bit-by-bit code sequence of received signals.

Obviously many modifications and variations of the present invention are possible in the light of the above teachings.

What is claimed is:

1. A decoding system for detecting and verifying pulse encoded signals comprising;
    a threshold detector responsive to a determinable amplitude of received signal for producing an output indicative of the presence of a pulse, each said pulse representing a digital bit;
    storage means for storing a plurality of pulse time encoded sequences, each characterized by a different multiple bit digital signal sequence representative of determinable information;
    a comparator arranged to receive the outputs of said threshold detector for sequentially comparing predetermined multiple bit pulse time encoded sequences of said received signals with said plurality of pulse time encoded sequences, said comparator being responsive to a confirmatory comparison for producing a signal representative of the presence of information represented by the code sequence so identified;
    indicator means arranged to receive the signal representative of the presence of a code sequence for indicating the reception of information represented by the identified code sequence; and
    means for indicating the carrier frequency of detected and identified pulse time encoded signals.

2. A decoding system as claimed in claim 1 wherein said threshold detector is operative to produce a quantized output signal indicative of the presence of a pulse.

3. A decoding system as claimed in claim 1 and including means for circulating pulse time encoded sequences of received signals through said comparator for causing comparison with said plurality of sequences of code information stored by said comparator.

4. A decoding system as claimed in claim 1 and including means for causing said comparator to compare said sequences of received signals with only selected code information.

5. A decoding system as claimed in claim 1 and including means for programming any selected code sequence or sequences selectively for comparison in said comparator.

6. A decoding system as claimed in claim 1 and including error correction means responsive to substantial confirmatory comparison of a particular code sequence for indicating the presence of the particular code so identified in the absence of one or more discrete code elements.

7. A decoding system as claimed in claim 6 wherein said error correction means is adjustable for determining its response in the absence of a selected number of discrete code elements within received code sequences.

References Cited

UNITED STATES PATENTS

| | | | |
|---|---|---|---|
| 3,078,443 | 2/1963 | Rose | 340—146.1 |
| 3,096,511 | 7/1963 | Taras. | |
| 3,202,761 | 8/1965 | Bibbero | 340—149 X |
| 3,307,184 | 2/1967 | Poterack et al. | |
| 3,373,404 | 3/1968 | Webb | 340—146.1 |
| 3,374,873 | 5/1968 | Sharma | 340—146.1 |

OTHER REFERENCES

Automatic Data Processing Glossary; Executive Office of the President, Bureau of the Budget; December 1962, p. 17.

EUGENE G. BOTZ, Primary Examiner

R. STEPHEN DILDINE, JR., Assistant Examiner

U.S. Cl. X.R.

325—41